Dec. 14, 1954
E. H. BURGESS ET AL
ELECTRICAL SYSTEM FOR SELECTIVE USE
OF DIRECT AND ALTERNATING CURRENTS
Filed Aug. 8, 1952
2,697,177
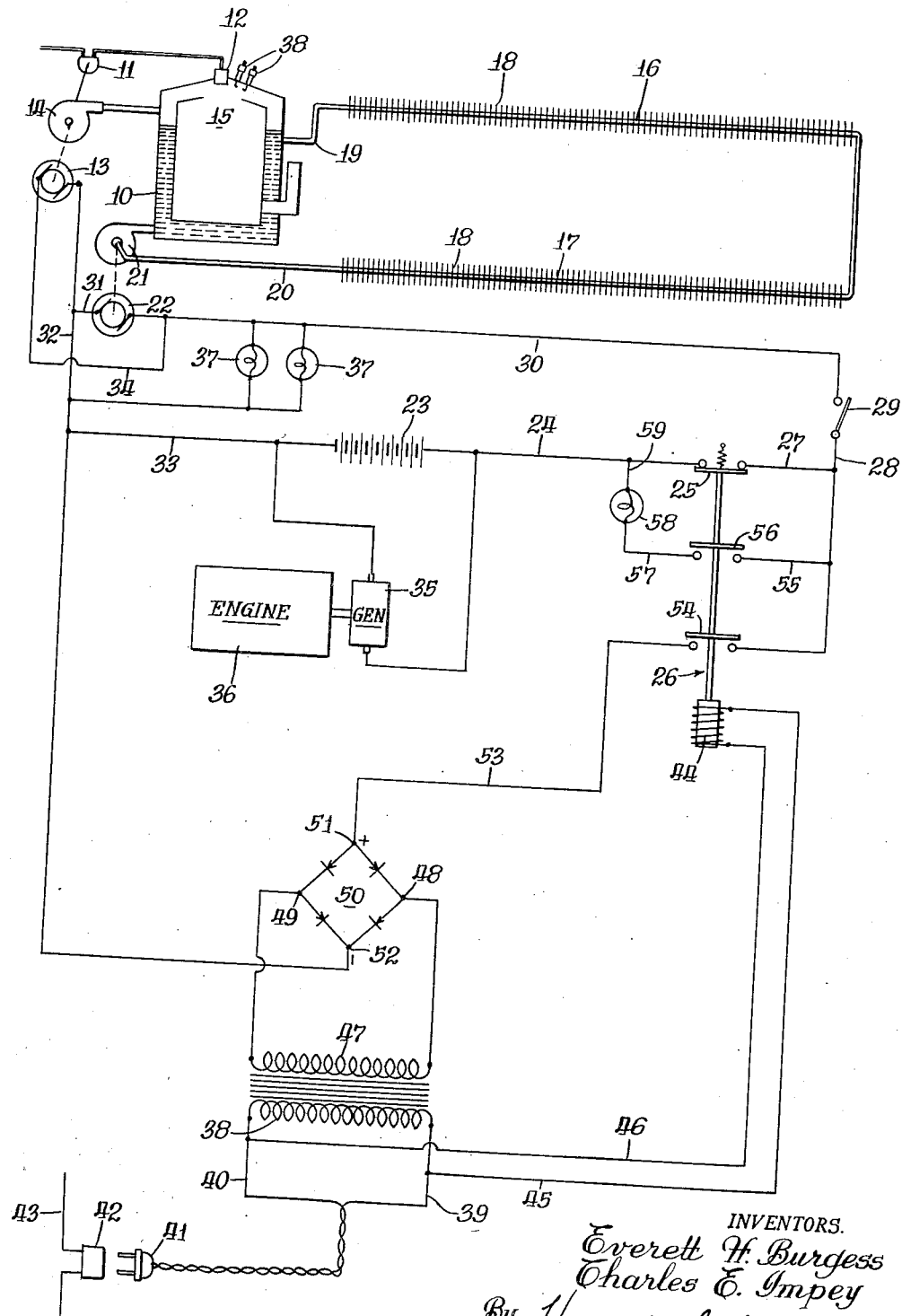
INVENTORS.
Everett H. Burgess
Charles E. Impey
By Harvey M. Gillespie
Atty.

United States Patent Office

2,697,177
Patented Dec. 14, 1954

2,697,177

ELECTRICAL SYSTEM FOR SELECTIVE USE OF DIRECT AND ALTERNATING CURRENTS

Everett H. Burgess, Elmwood Park, and Charles E. Impey, Lombard, Ill., assignors to Vapor Heating Corporation, Chicago, Ill., a corporation of Delaware Application August 8, 1952, Serial No. 303,332

4 Claims. (Cl. 307—64)

This invention has to do with the provision of an improved electrical system adapted for selective use with either direct or alternating current.

A principal object of the invention is to provide an electrical system of the above character suitable for use on automotive vehicles powered with internal combustion engines.

Vehicles of the above general class are usually provided with one or more storage batteries and with a direct current generator operated by the vehicle engine, during the operation of the vehicle, to store electrical energy in said batteries and to supply electric current to the electrical equipment connected in the circuit wiring of the system. On various types of vehicles, for example, highway buses and diesel powered railway cars, the electrical equipment usually includes heating and ventilating apparatus comprising electrically operated fans, liquid circulating and pressure pumps, and the like, which require large quantities of electrical current for their operation during the inactive or layover periods of the vehicle.

The present invention is directed particularly to the provision of simplified means whereby the electrical systems of such vehicles may be supplied with an adequate volume of direct current by merely connecting the electrical system of the vehicle into a service line of alternating current.

The present improvement also includes means for directing a "trickle" charge of direct current to the batteries so as to keep them active and thereby prevent freezing of the electrolyte therein during severe weather.

The invention is illustrated in the accompanying drawing in connection with the operating circuits of an oil-fired boiler for supplying heating medium to a space heater located in a diesel powered railway car. It is desirable to operate the boiler when the railway car is out of service for an appreciable length of time so as to maintain the car suitable for immediate use; also prevent freezing of the water in the boiler and radiators of the car. The boiler is designated by the numeral 10 and is constructed to burn a liquid fuel. A pump for delivering the liquid fuel to a spray nozzle 12 is operated by an electric motor 13. The same electric motor also operates a blower 14 for delivering combustion air into the fire chamber 15 of the boiler.

The space heater illustrated in the drawing includes a loop having portions 16, 17 which extend along opposite sides of the car and are provided with heat radiating fins 18. The inlet end 19 of the loop leads from the upper portion of the boiler 10 and the return 20 of said loop connects with a circulating pump 21. The operation of the pump enforces circulation through the boiler and through the space heater. The said pump 21 is operated by an electrical motor 22.

Both motors 13 and 22 are connected in parallel relation in a positive circuit which extends from one terminal of a storage battery 23 through lead 24, normally closed contact arm 25 of relay 26, leads 27, 28, main switch 29, and lead 30 through the motor 22 and thence through leads 31, 32 and 33 to the negative terminal of the battery. The energizing circuit for motor 13 extends from lead 30 through lead 34, motor 13, and leads 32, 33, to the negative terminal of the battery.

It will be observed that when the main switch 29 is closed, both motors 13, 22 are energized; the motor 13 serving to operate the fuel pump and the air blower to deliver fuel and air into the combustion chamber of the boiler and the motor 22 serving to operate the circulating pump 21. A generator 35 for generating direct current is connected into the leads 24, 33 at opposite sides of the battery 23 and is driven by an internal combustion engine 36. This engine may constitute the motive power for operating the vehicle or it may be an auxiliary equipment for operating only the electrical generator. However, it will be observed that when the internal combustion engine 36 is operating the direct electrical current generated by the generator 35 is utilized to charge the battery 23 and to supply electrical energy to the motors 13 and 22 and such other electrical equipment as may be connected into the main circuit. When the engine 36 constitutes the motive power of the vehicle and the operation of the engine is discontinued for brief periods, the storage batteries serve to supply the necessary electrical energy to the motor 13, 22 and such other electrical equipment as may be connected in the circuit such as lights 37, ignition, etc. However, when the vehicle is out of service for several hours the battery 23, in the absence of an auxiliary engine for operating the generator or an auxiliary source of electrical energy, may be wholly devitalized. Therefore, in order to avoid undue dissipation of the electrical energy from the battery and at the same time maintain the electrical equipment of the vehicle operative, when the vehicle is temporarily out of service, provision is made by this invention to utilize alternating current from a commercial power line. In order to accomplish this result the present invention includes the provision of a transformer, the opposite ends of which are connected by leads 39, 40 to a plug fitting 41 adapted to be plugged into a socket 42 interposed in a service power line 43 of alternating current. A solenoid 44 for actuating the relay 26 is connected by leads 45, 46 into the main alternating current leads 39, 40 so that the relay 26 is energized immediately upon insertion of the plug fitting 41 into the socket 42. The secondary coil 47 of the transformer is connected across opposite terminals 48—49 of a bridge type rectifier 50. The intermediate terminals 51—52 of the bridge are connected to the main circuit of the system so as to supply rectified electric current to the motors 13, 22, lights 37 and other equipment which may be connected into the main circuit. The flow path of the electric current from the rectifier 50 includes the lead 53, energized closed contact 54 of relay 26, lead 28, main switch 29, lead 30 through the motors 13 and 22 and thence through lead 32 back to the negative terminal of the rectifier 50. In addition to supplying rectifying current to the main or load circuit of the system a circuit is established through the battery 23 so as to direct a trickle charge to the battery. This circuit is not important as a battery charging circuit, but is intended merely to keep the electrolyte of the battery activated so as to prevent freezing thereof during cold weather. The "trickle" charging circuit for the battery extends from the positive lead 28 through lead 55, energized closed contact 56 of relay 26, lead 57, electric light bulb 58 and leads 59 and 24 to the battery 23, thence through leads 33 and 32 to the negative terminal 52 of the rectifier 50.

From the above disclosure it will be seen that the present improvement provides a simplified electrical system for vehicles, whereby the system may be energized, under certain conditions, by means of a generator operated by an internal combustion engine and under certain other conditions may be supplied with the necessary electrical current from a service line of alternating current.

We claim:

1. An electrical system adapted for selective use with sources of either direct or alternating current comprising a main circuit including positive and negative lines, a primary source of direct current comprising a generator connected by positive and negative leads across said positive and negative lines of the main circuit, a secondary source of direct current comprising a storage battery connected in said positive and negative leads in parallel with said primary source of direct current, whereby said generator is effective to recharge said battery simultaneously with the delivery of direct current to the main circuit, a third source of direct current comprising a rectifier having positive and negative terminals connected in positive and negative leads across the positive and negative lines of the main circuit, a transformer for delivering alternating current to said rectifier, a relay having a normally closed contact interposed in the first mentioned positive lead and an energized closed contact in the second mentioned positive lead; whereby the relay in its de-energized position connects said primary and secondary sources of direct current with the positive and negative lines of the main circuit and when in its energized position connects said rectifier with the positive and negative lines of the main circuit; and a second energized closed relay contact and a low voltage recharging circuit leading from said positive line through said second energized closed relay contact to the first mentioned positive lead at a location intermediate the primary and secondary sources and the normally closed contact of said relay, whereby the low voltage recharging circuit is effective to recharge the battery when the rectifier is effective to supply energizing current to the main circuit.

2. An electrical system adapted for selective use with sources of either direct or alternating current as defined in claim 1 characterized in that the said generator is operated by an internal combustion engine.

3. An electrical system adapted for selective use with sources of either direct or alternating current as defined in claim 2 characterized in that leads are provided for connecting said transformer into an alternating service line for activating said transformer, and means for connecting the relay actuator windings with said transformer, whereby the relay is automatically energized to connect said rectifier into said main circuit and to effectively disconnect said generator from said circuit.

4. An electrical system adapted for selective use with sources of either direct or alternating current as defined in claim 3 characterized in that said low voltage circuit through said battery includes an electric light bulb to limit the flow of electric current to said battery.

References Cited in the file of this patent

UNITED STATES PATENTS

| Number | Name | Date |
| --- | --- | --- |
| Re. 22,168 | Hamilton | Sept. 1, 1942 |
| 1,770,055 | Williams | July 8, 1930 |
| 1,953,602 | Hanley | Apr. 3, 1934 |